(12) United States Patent
Maeng

(10) Patent No.: US 8,041,824 B1
(45) Date of Patent: Oct. 18, 2011

(54) SYSTEM, DEVICE, METHOD AND SOFTWARE FOR PROVIDING A VISITOR ACCESS TO A PUBLIC NETWORK

(75) Inventor: Joon Maeng, Austin, TX (US)

(73) Assignee: Strauss Acquisitions, L.L.C., Wilmington, DE (US)

( * ) Notice: Subject to any disclaimer, the term of this patent is extended or adjusted under 35 U.S.C. 154(b) by 933 days.

(21) Appl. No.: 11/105,712

(22) Filed: Apr. 14, 2005

(51) Int. Cl.
*G06F 15/16* (2006.01)

(52) U.S. Cl. ........................... 709/229; 709/249

(58) Field of Classification Search .................. 709/249, 709/229
See application file for complete search history.

(56) References Cited

U.S. PATENT DOCUMENTS

| | | | | |
|---|---|---|---|---|
| 6,377,990 B1* | 4/2002 | Slemmer et al. | ............... | 709/225 |
| 6,591,306 B1* | 7/2003 | Redlich | ............... | 709/245 |
| 6,754,712 B1* | 6/2004 | Valencia | ............... | 709/227 |
| 6,996,073 B2* | 2/2006 | West et al. | ............... | 370/260 |
| 7,089,281 B1* | 8/2006 | Kazemi et al. | ............... | 709/203 |
| 7,127,524 B1* | 10/2006 | Renda et al. | ............... | 709/245 |
| 7,248,858 B2* | 7/2007 | Barber et al. | ............... | 455/414.1 |
| 7,353,280 B2* | 4/2008 | Chiles et al. | ............... | 709/228 |
| 7,389,534 B1* | 6/2008 | He | ............... | 726/15 |
| 7,499,438 B2 | 3/2009 | Hinman | | |
| 7,522,518 B1 | 4/2009 | Satapathy | | |
| 7,633,909 B1 | 12/2009 | Jones et al. | | |
| 2002/0009078 A1* | 1/2002 | Wilson et al. | ............... | 370/389 |
| 2002/0075844 A1* | 6/2002 | Hagen | ............... | 370/351 |
| 2002/0191572 A1* | 12/2002 | Weinstein et al. | ............... | 370/338 |
| 2003/0030662 A1 | 2/2003 | Poisson et al. | | |
| 2003/0069915 A1 | 4/2003 | Clough et al. | | |
| 2003/0200455 A1* | 10/2003 | Wu | ............... | 713/200 |
| 2003/0212795 A1* | 11/2003 | Harris et al. | ............... | 709/227 |
| 2005/0073979 A1 | 4/2005 | Barber | | |
| 2005/0086346 A1 | 4/2005 | Meyer | | |
| 2005/0149757 A1 | 7/2005 | Corbett et al. | | |
| 2005/0193188 A1* | 9/2005 | Huang | ............... | 713/1 |
| 2005/0198233 A1* | 9/2005 | Manchester et al. | ............... | 709/221 |
| 2005/0216598 A1* | 9/2005 | Wu et al. | ............... | 709/232 |
| 2006/0165103 A1 | 7/2006 | Trudeau et al. | | |
| 2007/0025302 A1 | 2/2007 | Zhang et al. | | |
| 2007/0127430 A1 | 6/2007 | Maeng | | |
| 2007/0127500 A1 | 6/2007 | Maeng | | |
| 2009/0022102 A1* | 1/2009 | Nykanen et al. | ............... | 370/329 |
| 2009/0040995 A1* | 2/2009 | Buddhikot et al. | ............... | 370/338 |

OTHER PUBLICATIONS

C. Perkins, IP Encapsulation within IP, Oct. 1996, Network Working Group, RFC 2003, p. 1, 4.*
Mark Henricks, Linksys Wireless Access Point Router with 4-port switch, Dec. 17, 2001, C|NET, p. 1-3.*
Linksys, Linksys Wireless Devices, Jan. 28, 2005.*
Linksys, Wireless-G Broadband Router, 2002.
Office Action for U.S. Appl. No. 11/671,918 mailed Apr. 13, 2011.

* cited by examiner

*Primary Examiner* — Joseph Avellino
*Assistant Examiner* — James Conaway
(74) *Attorney, Agent, or Firm* — McDonnell Boehnen Hulbert & Berghoff LLP

(57) ABSTRACT

A system, device, method and software for providing a visitor access to a public network are disclosed. In one form, a virtual visitor enabled local area network includes a visitor access point operable to provide a visitor access to a public network while connected to a local area network (LAN). The visitor access point is operable to protect the LAN using a virtual visitor network established between the visitor access point and a virtual visitor network gateway.

30 Claims, 10 Drawing Sheets

FIG. 3.A
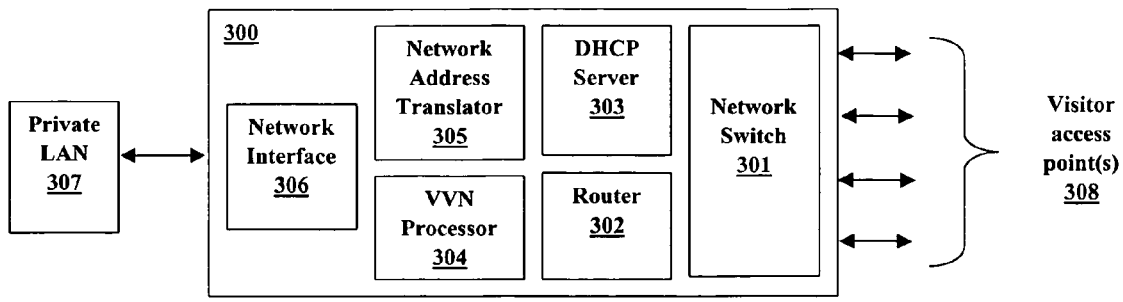
FIG. 3.B
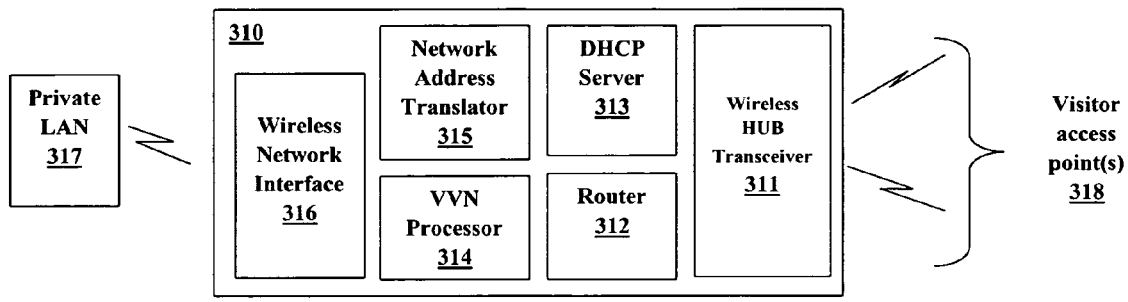
FIG. 4
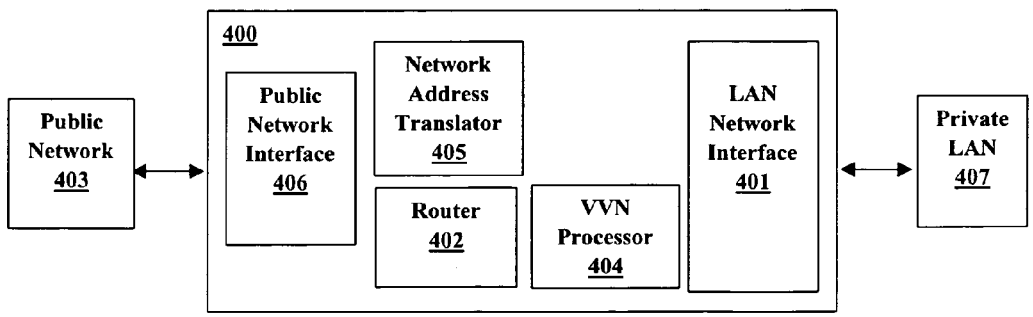

SYSTEM, DEVICE, METHOD AND SOFTWARE FOR PROVIDING A VISITOR ACCESS TO A PUBLIC NETWORK

FIELD OF THE DISCLOSURE

The disclosure relates generally to local area networking, and more particularly to a system, device, method and software for providing a visitor access to a public network.

BACKGROUND

Most enterprises do not allow visitors to access their private local area networks (LANs) due to security concerns creating difficult work environments when visitors need to access the Internet or remote access accounts via public networks. The primary reason enterprise network managers limit access is to protect their network, servers, systems, etc. from direct or indirect malignant attacks. As such, a visitor's productivity can be significantly affected if a visitor cannot access the Internet while visiting an enterprise. For example, consultants may not be able to efficiently advise their clients without having access to a public network while they are working with clients.

Currently, some conventional solutions are available including creating visitor accounts to provide a visitor access public access with significantly limiting access to the private LAN. Though effective, this usually requires client and server synchronized software to provide access and management of user names, passwords, access levels, etc. Such arrangements may be functional but leave a network vulnerable to outside attacks when a user accesses a public network and provides for continuous management and monitoring of network accounts. As such, there is a need for enterprises to provide visitors access to a public network from within their local area network without compromising the security of their own network or having to maintain user accounts, passwords, custom software, etc.

SUMMARY OF THE INVENTION

According to one aspect of the invention, a virtual visitor enabled local area network includes a visitor access point operable to provide a visitor access to a public network while connected to a local area network (LAN). The visitor access point is operable to protect the LAN using a virtual visitor network established between the visitor access point and a virtual visitor network gateway.

According to another aspect of the invention, a device for providing visitor access to a public network via a private local area network is provided. The device includes a visitor access port operable to enable a visitor to access a public network from within a private local area network (LAN) while protecting the private LAN from the visitor. The device further includes a communication interface operably coupled to the visitor access port and the private LAN and the communication interface is operable to communicate information between the visitor access port and a selective location within the private LAN.

According to a further aspect of the invention, a network enabled gateway operable to provide a visitor access to a public network from within a private local area network (LAN) is disclosed. The gateway includes a public network access interface operable to communicate processed virtual visitor network data packets to a public network that originate from within a private local area network (LAN). The gateway further includes a virtual network processor operable to process public network access data packets to provide virtual visitor network data packets for communication within the private LAN to provide a visitor access to the public network.

BRIEF DESCRIPTION OF THE DRAWINGS

Other advantages, features and characteristics of the invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 3A illustrates a functional block diagram of a virtual visitor network module for providing a user access to a public network via a private local area network according to one embodiment of the invention;

FIG. 3B illustrates a functional block diagram of a wireless enabled virtual visitor network module for providing a user access to a public network via a private local area network according to one embodiment of the invention;

FIG. 4 illustrates a functional block diagram of a virtual visitor network gateway according to one embodiment of the invention;

DETAILED DESCRIPTION OF THE INVENTION

Figure 1:
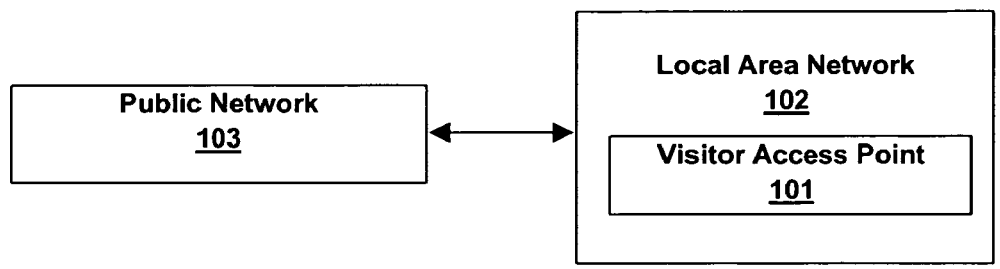
FIG. 1 illustrates a functional block diagram of a local area network incorporating a visitor access point according to one embodiment of the invention.

FIG. 1 illustrates a functional block diagram of a local area network incorporating a visitor access point according to one embodiment of the invention. A local area network (LAN) 102 includes at least one visitor access point 101 provided within local area network (LAN) 102 and operable to allow a user to access a public network 103 such as the Internet. Local area network 102 may include any type of network including, but not limited to, an Ethernet, ring network, token ring network, star network, bus network, asynchronous network, and the like.

Visitor access point 101 allows for a visitor that would normally not have access to LAN 102 to access public network 103 when connected to LAN 102. For example, a visitor may couple a computer system (not expressly shown) to visitor access point 101 and may require accessing public network 103. Visitor access point 101 advantageously allows for protection of LAN 102 while a user accesses public network 103 through encapsulating data packets communicated via visitor access point 101 and LAN 102. In this manner, other network locations or nodes within LAN 102 (not expressly shown) may be isolated from inquiries, data requests, snooping, malignant attacks, etc. initiated by a visitor or other agent when a visitor connects to LAN via visitor access point 101.

Figure 2:
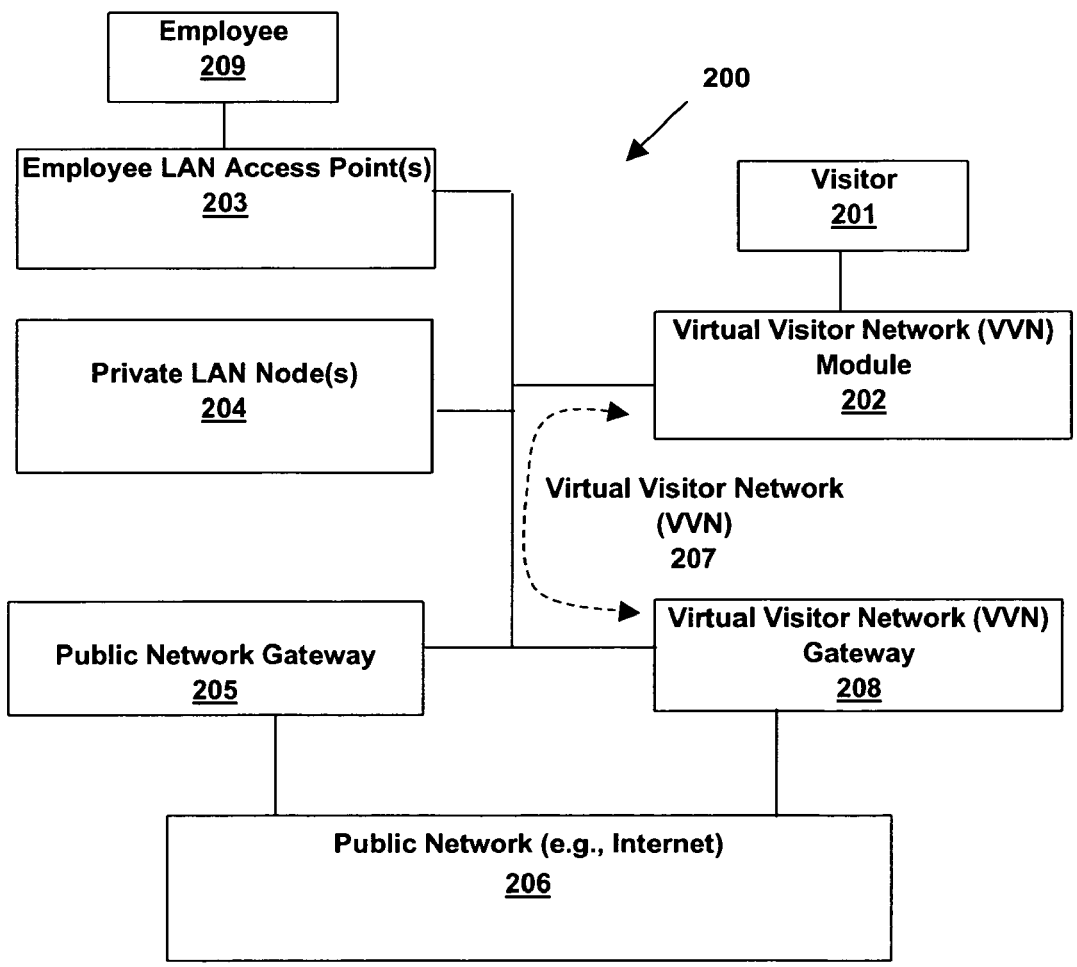
FIG. 2 illustrates a functional block diagram of a virtual visitor network (VVN) operable to provide a visitor access to a public network via a private local area network according to one embodiment of the invention.

FIG. 2 illustrates a functional block diagram of a virtual visitor network (VVN) operable to provide a visitor access to a public network via a private local area network according to one embodiment of the invention. A private local area network, illustrated generally at 200, includes a visitor (visitor's computer) 201 communicatively coupled to private LAN 200 via a virtual visitor network (VVN) module 202 operable to allow a visitor to access a public network 206 via virtual visitor network (VVN) gateway 208. A virtual visitor network (VVN) 207 includes a virtual network provided within private LAN 200, which facilitates visitor 201 accessing public network 206. Private LAN 200 further includes one or more employee 209 LAN access point(s) 203 providing a user, such as an employee and guest having sufficient access rights, access to private LAN 200 and one or more private LAN node(s) 204 coupling one or more types of network devices such as servers, printers, fax machines, copiers, data storage devices, or any other type of equipment or device that may be coupled to a local area network. The public network gateway 205 may include a router, a firewall, and/or a network address translator (NAT) to process traffic between the private LAN 200 and the public network 206. VVN 207 confines packets communicated between visitor 201 and public network 206 to VVN 207. VVN gateway 208 typically does not handle traffic communicated between public network 206 and an employee 209. In one embodiment, private local area network node(s) 204 may include other user or employee systems that may be accessed or networked together. For example, a user coupled to private LAN 200 via a valid user LAN access point 203 may access another user's system via a private LAN node 204.

During operation, visitor 201 may access public network 206 through connecting to a VVN module 202. VVN module 202 detects that visitor 201 is attempting to access network and initiates a process to isolate visitor 201 from private LAN 200 while allowing visitor 201 to access only public network 206. For example, VVN module 202 processes data packets initiated by a visitor's computer system 201 coupled to VVN module 202 such that other locations within private LAN 200 ignore any unauthorized data or access requests to one or more locations within private LAN 200. VVN gateway 208 identifies data packets communicated by VVN module 202 and as data packets are communicated by VVN module 202, VVN gateway 208 receives the data packets and processes the data packets prior to communicating the data packets to public network 206. For example, VVN gateway 208 modifies header information within the data packets to include a source address of VVN gateway 208. As data packets are received from public network 206 in response to data packets communicated by VVN gateway 208, VVN gateway 208 processes the data packet to provide a destination or IP address of VVN module 202 and communicates the data packet to VVN module 202 using private LAN 200. As such, each packet is processed to encapsulate or isolate all other network locations within private LAN 200 from the visitor 201 requested data and communicated only to visitor 201 allowing a visitor 201 to access a public network 206, such as the Internet, from within a private local area network without compromising security of a private local area network or having to manage or create visitor/user access accounts with limited access to network locations within a local area network. In one embodiment, VVN gateway 208 and the public network gateway 205 may be integrated into a single server or system operable to provide accessing to public network 206.

In another embodiment, VVN module 202 may be used to allow an employee to access public network 206 via VVN gateway 208. In this manner, an employee that may not be able to access a private LAN node(s) 204 or an employee LAN access point(s) 203 may access only public network 206 via virtual visitor network 207 when connected to VVN module 202.

FIG. 3A illustrates a functional block diagram of a virtual visitor network module for providing a user access to a public network via a private local area network according to one embodiment of the invention. A virtual visitor network module (VVN), illustrated generally as VVN module 300, includes an network interface 306 operable to couple VVN module 300 to a private LAN 307 such as an Ethernet network via a wire line connection such as through copper connections, cable or coaxial based connections, fiber optic connections, etc. VVN module 300 includes a network address translator (NAT) 305 operable to resolve addresses contained within data packets and a DHCP server 303 operable to assign dynamic IP addresses to visitor computers (not expressly shown). A router 302 and network switch 301 provide for routing of information to various wire line visitor access points 308 for one or more visitors connecting to private LAN 307. Router 302 enables connection or coupling of two or more networks and functions as a sorter and interpreter as it resolves addresses and passes data streams or packets to a proper destination. Network switch 301 may include a switch (e.g., Ethernet switch) operable to provide dedicated bandwidth or a hub operable to provide shared bandwidth to visitor access points 308. If network switch 301 includes a hub, visitor access points 308 only share bandwidth between access points without sharing bandwidth with other non-visitor access points that may be connected to network switch 301. Though network interface 306 is illustrated as a single access point operable to provide access to private LAN 307, it should be understood that VVN module 300 may configured to accommodate more than one network address within private LAN 307. VVN module 300 further includes a virtual visitor network (VVN) processor 304 operable to process data packets communicated by one or more systems coupled to visitor access points 308 and desiring access to a public network, such as the Internet, via private LAN 307.

During operation, VVN module 300 dynamically assigns a network IP address when a visitor connects to visitor access points 308 and performs a network address translation using NAT 305 when data is communicated using the assigned IP addresses. VVN processor 304 processes data communicated between private LAN 307 and visitor access point(s) 308 to add and remove data packet header information for data packets and provide a unique network IP address that identifies a visitor when connected to one of visitor access point(s) 308. VVN processor 304 encapsulates data communicated via visitor access points 308 through isolating data packets to select or specific network addresses within private LAN 307. For example, VVN processor 304 may provide a network destination address for only a network gateway (not expressly shown) provided within or in association with private LAN 307 that allows for access to a public network. In this manner, no other locations or network addresses within private LAN 307 may be accessed by a computer system connected to one of visitor access point(s) 308. As incoming data packets are communicated from private LAN 307 and received by network interface 306, network address translator 305 translates the address information for the data packets and VVN processor 304 verifies heading information and detects if data packets having IP addresses for a visitor coupled to one of visitor access point(s) 308 have been received. If a visitor's data packet has been received, VVN processor 304 restore the information and router 302 and network switch 301 processes and communicates the data packet to the appropriate visitor connected to a visitor access point 308.

In one embodiment, VVN module 300 may allow a visitor to use a network printer (not expressly shown) accessible by VVN module 300. For example, a network printer may be coupled directly to VVN module 300 and VVN module 300 may include a print server (not expressly show) and a network printer connected to VVN module 300 via, for example, one of visitor access point(s) 308. In another embodiment, a network printer may be accessed by a visitor coupled to one of visitor access point(s) via private LAN 307. For example, VVN module 300 may include a print server having network IP addresses for one or more network printers and may allow for access to a printer internal to private LAN 307 without using a print server (not expressly shown) located within private LAN 307. In this manner, visitor originated data may be selectively communicated to a specific destination or IP address within private LAN 307 without jeopardizing network security and allowing a visitor to print a document.

FIG. 3B illustrates a functional block diagram of a wireless enabled virtual visitor access module for providing a user access to a public network via a private local area network according to one embodiment of the invention. A wireless virtual visitor network module, illustrated generally as wireless VVN module 310, includes an wireless network interface 316 operable to couple wireless VVN module 310 to a private LAN 317 such as an Ethernet network via a wireless connection operable to communicated via wireless communication operable to an 802.11-enabled wireless communication protocol including, but not limited to 802.11a, g, or b. Other types of wireless communication such as infrared laser communication, mobile or cellular wireless communication, near field communication and the like may also be employed.

Wireless VVN module 310 includes a network address translator (NAT) 315 operable to translate addresses contained within data packets and a DHCP server 313 operable to assign dynamic IP addresses to visitor computers wirelessly coupled to wireless VVN module 310 via wireless visitor access point(s) 318. A router 312 and wireless hub transceiver 311 provide for routing of information to and from wireless visitor computers connected via wireless visitor access point (s) 318 and further connected to private LAN 317. Though illustrated as a single access point to private LAN 317, it should be understood that wireless VVN module 310 may configured to accommodate more than one network address within private LAN 317. Wireless VVN module 310 further includes a virtual visitor network (VVN) processor 314 operable to process data packets communicated from one or more systems coupled to wireless visitor access point(s) 318 and a VVN server (not expressly shown) and desiring access to a public network, such as the Internet, via private LAN 317.

During operation, a user may access private LAN 317 using a wireless-enabled computer system operable to connect to wireless visitor access point(s) 318. For example, wireless VVN module 310 may be placed proximal to a conference room, visitor center, etc. which may be frequently used by visitors. VVN module 310 being wirelessly coupled to private LAN 317 allows for flexible placement of VVN module 310 in various locations such that VVN module 310 may be operational without a user having to physically access wireless VVN module 310. However, in other embodiments, wireless VVN module 310 may include one or more wire line connection ports or visitor access point allowing a user to connect directly to wireless VVN module 310.

Wireless VVN module 310 further allows for visitor's to have flexibility in being untethered to wireless VVN module 310. A visitor may access wireless VVN module 310 through performing a search on available wireless networks and, upon identifying a wireless signal or wireless visitor access point 318 communicated by wireless hub transceiver 311, a user may elect to connect to wireless VVN module 310 to access private LAN 317.

FIG. 4 illustrates a functional block diagram of a virtual visitor network gateway according to one embodiment of the invention. A virtual visitor network (VVN) gateway, illustrated generally at 400, includes a network interface 401 such as a Ethernet module operable to connect to a private LAN 407, a public network interface 406 operable to communicate with a public network 403 such as the Internet. VVN gateway 400 further includes a VVN processor 404, a router 402 and a network address translator (NAT) 405. VVN processor 404 is operably associated with one or more virtual visitor network modules having virtual visitor network processors to process data packets communicated by a virtual visitor network provided within private LAN 407. NAT 405 is used to bridge multiple VVN modules using a relatively small number of IP addresses in public network 407. Router 402 routes data packets in a public network 403 such as the Internet.

During operation, VVN gateway 400 provides a visitor access to a public network 403 via a private LAN 407 and manages communication of data between private LAN 407 and public network 403. As data packets are communicated from a VVN module located within private LAN 407, VVN gateway 400 receives data packets via LAN network interface 401 and translates data packets to determine if the data packets were communicated from a VVN module. If a data packet was communicated from a VVN module, VVN processor 404 converts the data packets into a standard IP data packet having standard IP protocols. VVN processor 404 maintains a network address for the VVN module and when requested data packets are received from public network 403 via public network interface 406, VVN processor 404 identifies the VVN module and converts the public data packets into to encapsulate the data packets and communicate the data packets to only the VVN module. In this manner, a visitor accessing private LAN 407 may access public network 403 through VVN gateway 400.

Figure 5:
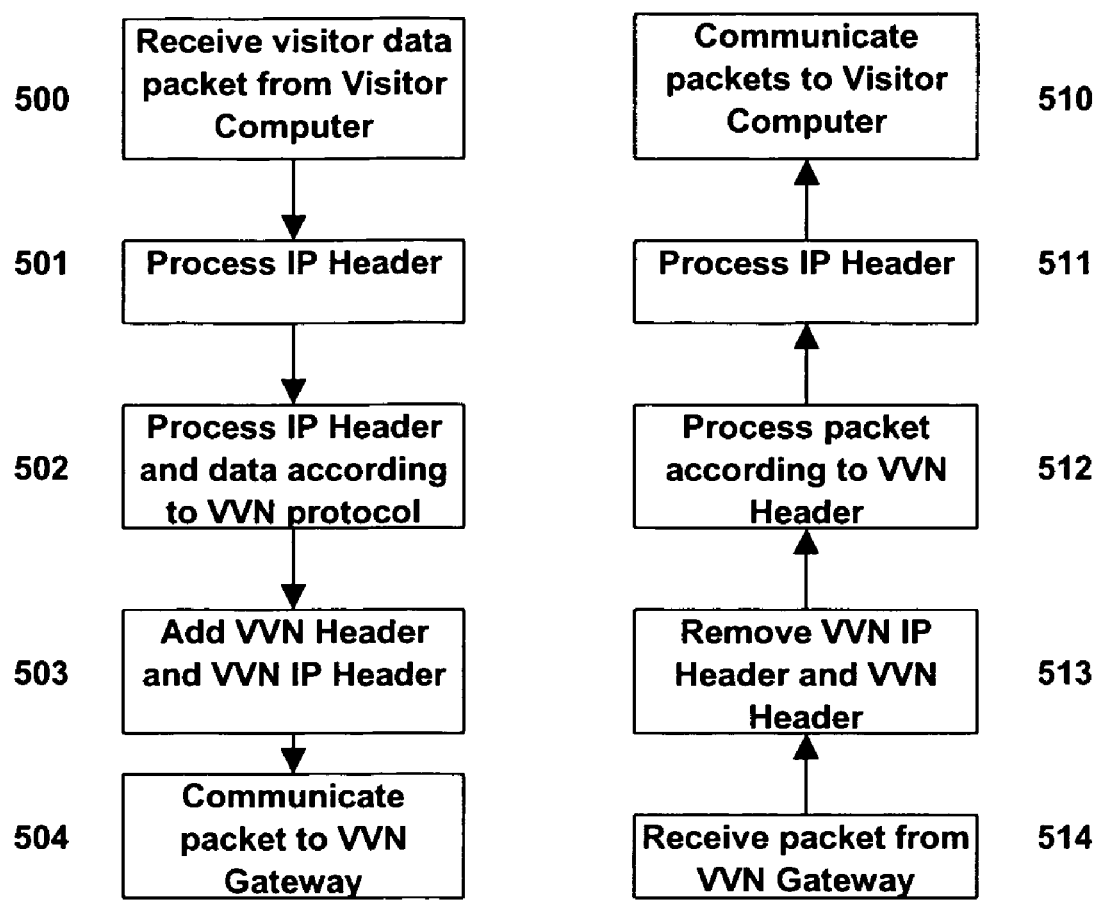
FIG. 5 illustrates a flow diagram of a method for processing data packets using a virtual visitor network module according to one embodiment of the invention.

FIG. 5 illustrates a flow diagram of a method of processing data packets using a virtual visitor network module according to one embodiment of the invention. The method may be employed within a program of instructions embodied within a computer readable medium, a memory device, encoded logic, or other devices, modules or systems operable to use a portion or all of the method illustrated in FIG. 5.

The method begins generally when a virtual visitor module, such as module VVN module 202 illustrated in FIG. 2, VVN module 300 illustrated in FIG. 3A, VVN module 310 illustrated in FIG. 3B, or any other type of module operable to provide a virtual visitor network for enabling a visitor's computer system to access a public network from within a private LAN is connected to the private LAN. Data packets may be received from a visitor computer system (step 500) or from a VVN gateway (step 514). At 500, a visitor computer transmits a data packet having an IP header and data to VVN module. VVN module receives a visitor's data packet 500 and processes IP header 501 of the data packet and replaces the source address with VVN module address assigned by a network server. For example, if a visitor's IP address is '192.16.1.1' and VVN module address is '20.1.10.1', VVN module's address would be provided instead of the visitor's IP address within the IP header.

Upon processing the IP header at 501, the visitor's data packet including the IP header and the data may be processed according to a VVN protocol 502. For example, a VVN protocol may include scrambling the information or data, or applying a security protocol, to make the data contained within the data packet meaningless to other network nodes, hosts, locations, etc. within a private network. At step 503, VVN module then encapsulates the visitor's packet by adding a VVN header to indicate the method used in processing the visitor's packet and then adds a VVN IP header to indicate the VVN gateway address to direct the packets to VVN gateway. Packets are then communicated to the VVN gateway 504.

At step 514, when a data packet is received from VVN gateway 514 and operable to be processed by a VVN module, VVN module removes the VVP IP header and VVN header from the packet 513 from the data packet and processes the data packet 512 according to information specified in the VVN header 512. For example, a data packet may be processed using a VVN protocol and may include de-scrambling the information or data, or applying a security protocol to restore data packets processed by VVN gateway. The IP header is then processed 511 by replacing the destination address to include the visitor's IP address 511 and then communicates the data packet to the visitor computer 510.

Figure 6:
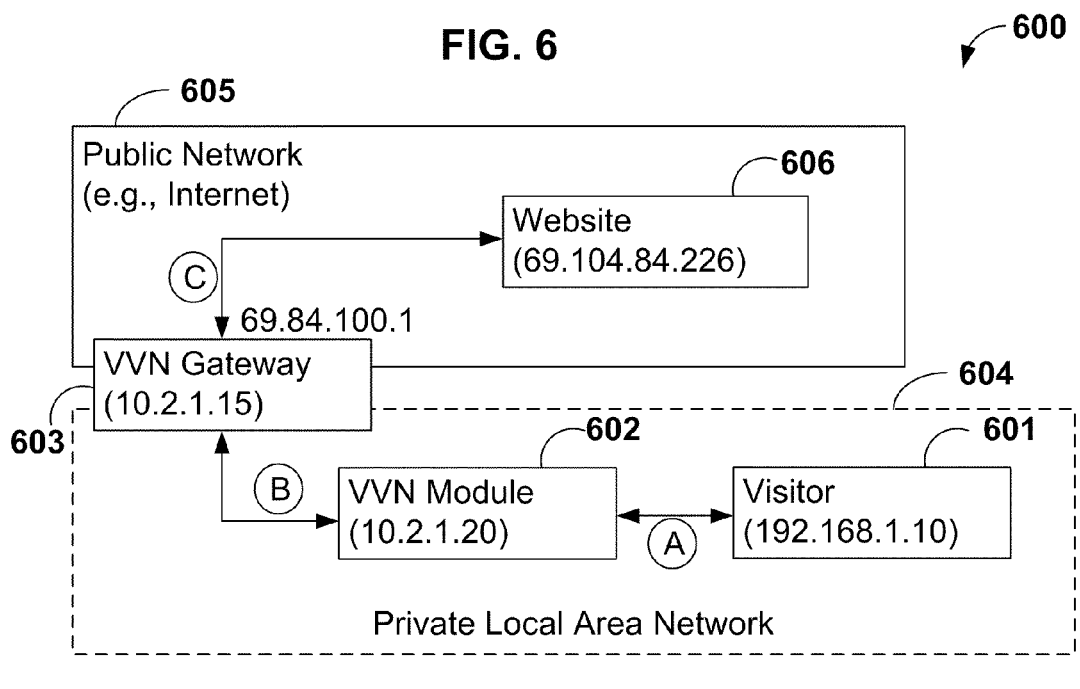
FIG. 6 illustrates a functional block diagram for encapsulating visitor data packets within a private local area network according to one embodiment of the invention.

FIG. 6 illustrates a functional block diagram for encapsulating visitor data packets within a private local area network according to one embodiment of the invention. A public network accessible by a private local area network (LAN) incorporating a virtual visitor network (VVN) is generally illustrated at 600 and includes a visitor's computer or visitor 601 having an Internet Protocol (IP) address of "192.168.1.10" is coupled to a virtual visitor network (VVN) module 602 having an IP address of "10.2.1.20" and virtual visitor network (VVN) gateway 603 having an IP address of "10.2.1.15" within a private local area network (LAN) 604. VVN gateway also has a public IP address such as 69.84.100.1. IP addresses within the private LAN 604 are assigned internally and may not be visible from the public network 605. A website 606 having a public IP address of "69.104.84.226" may be accessed using a public network 605 such as the Internet coupled to VVN gateway 603. A visitor IP data packet 611 is communicated between visitor 601 and VVN module 602 as illustrated at "A". Similarly, a VVN data packet 614 is communicated between VVN module 602 and VVN gateway 603 as illustrated at "B". An IP data packet 619 is communicated between VVN gateway 603 and website 606 as illustrated at "C".

During operation, a visitor may access a public network 605 via a private LAN 604 through coupling a computer system at 601 having an IP address of "192.168.1.10" to VVN module 602. An visitor data packet 611 communicated at "A" from visitor 601 contains a source (Src) address=192.168.1.10 identifying the assigned IP address of the visitor's computer system and a destination (Dst) address=69.104.84.226 identifying web site 606 requested by the visitor. VVN module 602 detects a connection (either wireless or wire line) and translates the source IP address of visitor data packet 611 to include a new IP address, such as VVN gateway 603's IP address of "10.2.1.20". For example, VVN module 602 includes a network address translator and VVN processor (not expressly shown) that changes, converts, or appends visitor data packet 611's IP header 612 to include a VVN IP header 615 having a source (Src) IP address of "10.2.1.20" and a destination (Dst) address of "10.2.1.15". IP header 617 is modified to include a source (Src) IP address of "10.2.1.20" and a destination (Dst) address of "69.104.84.226". Said another way, source data for visitor data packets are replaced with an IP address of a valid VVN module such as VVN module 602 (e.g. "10.2.1.20") and destination data for visitor data packets are replaced with an IP address of VVN gateway 603 (e.g. "10.2.1.15"). In this manner, visitor data packets are confined between VVN gateway 603 and VVN module 602 employing a VVN protocol that isolates visitor data packets 611 when communicated within private LAN 604 using a VVN protocol while retaining original source and destination information for visitor 601.

An exemplary VVN data packet 614 may include processing the visitor data packet 611 to include a VVN protocol having a VVN header 616 and a VVN IP header 615. One or more values may be provided within VVN header 616 to indicate a method or type of modification used to process visitor data packets 611. For example, a simple re-arrangement of bits or data encryption methods may be used for processing visitor data packets 611 originating from visitor 601. When VVN gateway 603 receives VVN packet 614, it removes VVN IP header 615 and processes VVN packets 614 based on information stored within VVN header 616. For example, a decryption or other bit deciphering process may be used to restore the data packets to determine destination data to create IP data packet 619.

In one embodiment, VVN gateway 603 may include more than one IP address for use in communicating data packets. For example, VVN gateway 603 may include an IP address for internal routing within private LAN 604 (e.g. "10.2.1.15") and an IP address communicating data via public network 605 (e.g. "69.84.100.1"). As illustrated above, VVN gateway 603 replaces VVN data packet 614 to include an IP header with having VVN gateway 603's own IP address resulting in IP data packet 619. When IP data packets are returned from website 606, VVN gateway 603 and VVN module 602 used stored information maintained by VVN gateway 603 and VVN module 602 in association with a NAT to send a reply or return data packets to visitor 601. Processing of IP data packets 619 returned from website 606 are modified in a reverse sequence to return data to visitor 601.

In one embodiment, a visitor data packet 611 may be processed by VVN module 602 to include only a VVN IP header 615 without including any additional information within VVN header 616. In this manner, no additional processing, other then removing VVN IP header, will be required. In another embodiment, VVN header 616 may not be provided as a part of visitor data packet 611 and as such no additional processing would be required when visitor data packet 611 is communicated to VVN gateway 603 or returned to VVN module 602.

In one embodiment, processing visitor data packets 611 using a VVN protocol provided by VVN module 602 and VVN gateway 603 renders the visitor data packets 611 useless when communicated to an un-intended device within private LAN 604. For example, VVN gateway 603 and VVN module 602 may be the only devices within private LAN 604 having knowledge of a VVN protocol used and other devices or systems connected to private LAN 604 may not be able to restore VVN packets 614. As such, devices or systems within private LAN 604 may discard or ignore VVN packets 614 when received. In this manner, visitor data packets 611 that originate from a visitor's system are communicated by visitor 601 and processed by VVN module 602 to generate VVN packets 614 which cannot cause security concerns within private LAN 604. Similarly, IP data packets 619 that are returned from public network 605 are processed by VVN gateway 603 to produced VVN packets 614 that can only be consumed by VVN module 602 provided within private LAN 604.

In one embodiment, a security protocol such as IPsec, secure socket layer (SSL), may be used in combination with a VVN protocol. For example, a secure socket layer (SSL) protocol may be used prior to or after processing data packets based on a VVN protocol provided by VVN module 602 and/or VVN gateway 603. Through providing a security protocol or SSL between VVN module 602 and VVN gateway 603, VVN packets 614 are confined to within a SSL-enabled channel established between VVN gateway 603 and VVN module 602.

In another embodiment, VVN gateway 603 and VVN module 602 may use either a dynamic IP addresses or a static IP addresses. For example, a DHCP server (not expressly shown) provided as a part of private LAN 604 may assign a dynamic address to VVN gateway 603 and/or VVN module 602. A DHCP server works in association with a client computer and enables individual computers on a network to obtain their configurations from a DHCP server. DHCP allows a network administrator to supervise and distribute IP addresses from a central server (not expressly shown) that automatically sends a new IP address when a computer is connected to private LAN 604. For example, when VVN module 602 is initialized, VVN module 602 registers with VVN gateway 603 and VVN module 602 and VVN gateway 603 both agree on one or more processing methods or protocols for processing VVN packets 614 to be communicated within private LAN 604.

Figure 7:
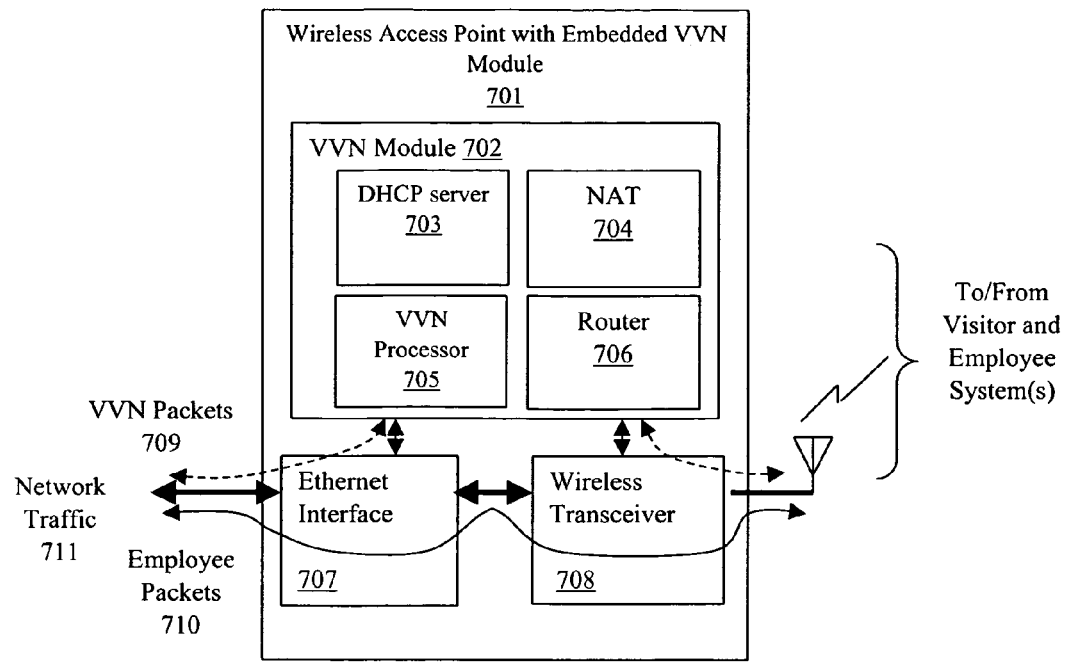
FIG. 7 illustrates a functional block diagram of network traffic within a private local area network having an access point for a visitor and an employee according to one embodiment of the invention.

FIG. 7 illustrates a functional block diagram of network traffic within a private local area network having an access point for a visitor and an employee according to one embodiment of the invention. A wireless network access point (AP), illustrated generally at 701 includes an embedded virtual visitor network (VVN) module 702 having a DHCP server 703, a network address translator (NAT) 704, a router 706 and a VVN processor 705. Communication with a visitor's or employee's computer system is provided using a wireless transceiver 708 operable to communicate using an 802.11-based protocol. Other wireless transceivers and protocols may also be used. Ethernet interface 707 provides communication to/from a private LAN (not expressly shown).

During use, network traffic 711 includes both VVN packets 709 and employee packets 710 communicated through using embedded VVN module 702. For example, a user may select from one or more Service Set Identification (SSID's) transmitted by wireless transceiver 708 for wireless access point 701. In one form, an employee network SSID may be broadcast by wireless transceiver 708 and an employee may enter a valid password to access an employee network within private LAN (not expressly shown). Similarly, wireless transceiver 708 may broadcast a visitor SSID allowing a visitor to connect to wireless access point 701 using a visitor SSID. VVN module 702 having NAT 704 and router 706 may then determine the source of a data packet (either employee or visitor) received by wireless transceiver 708 and process based on the SSID a user connects (either employee or visitor) to wireless access point 701 accordingly. For example, all data packets communicated the visitor SSID would be processed by VVN processor 705 to create VVN packets 709 that may be communicated within network traffic 711 of a private LAN. For example, dotted lines illustrated in FIG. 7 generally indicate data packets originating from a visitor are processed using VVN module 702 and provided within network traffic 711 using Ethernet interface 707. Additionally, data 5 packets originating from an SSID for an employee are generally illustrated as employee packets 710 as a solid line traversing through VVN module 702 via wireless transceiver 708 and Ethernet interface 707 and included within network traffic 711. Employee packets 710 traverse through wireless access point 701 without having to be processed by VVN processor 705 to generate VVN packets 709.

Figure 8:
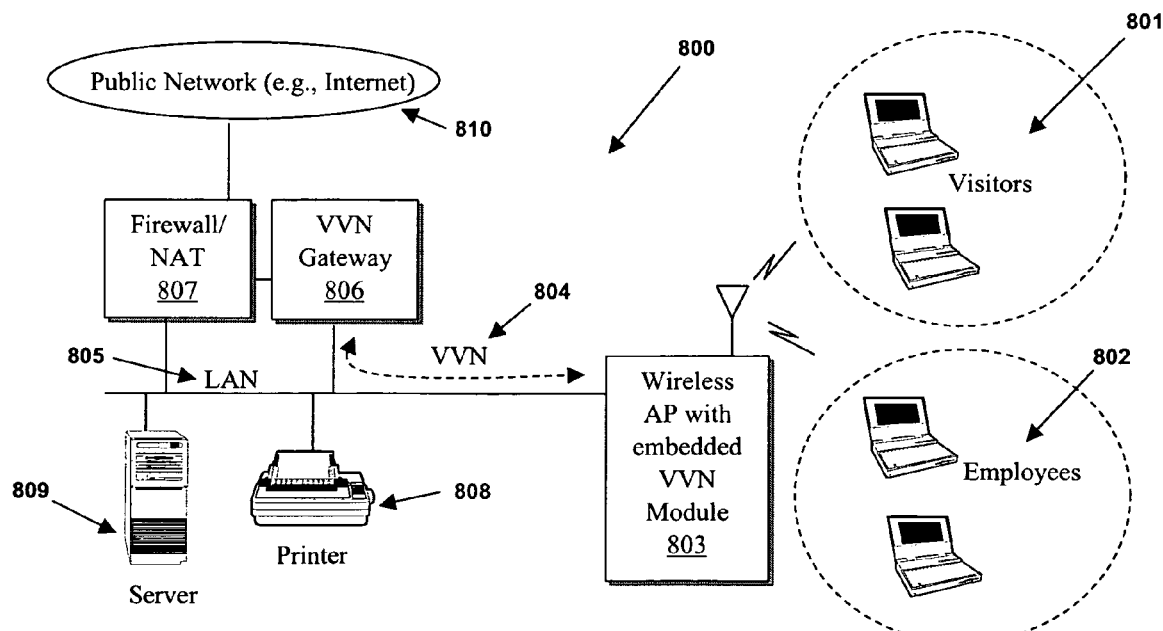
FIG. 8 illustrates a functional block diagram of network for providing visitors and employees access to a public network using a wireless local area network according to one embodiment of the invention.

FIG. 8 illustrates a functional block diagram of network for providing visitors and employees access to a public network using a wireless local area network according to one embodiment of the invention. A private local area network employing a wireless access point, illustrated generally at 800, includes a wireless access point 803 having an embedded virtual visitor network module and operable to communicatively couple one or more visitor systems 801 and/or employee systems 802 to a private local area network (LAN) 805. Private LAN 805 further includes a network printer 808, server 809 and other types of network nodes. Firewall and network address translator (NAT) 807 are coupled to private LAN 805 and provide access to a public network 810 such as the Internet. Virtual visitor network (VVN) gateway 806 works in association with wireless access point 803 to provide a virtual visitor network (VVN) 804.

During use, visitors may connect computers via wireless access point 803 which may be a 802.11-enabled wireless access point employing Service Set Identification (SSID). SSID is a 32-character alphanumeric key uniquely identifying a wireless access point such as wireless access point 803. In one embodiment, wireless access point 803 may use two or more SSIDs to distinguish visitors from employees, valid users, etc. For example, one of the SSIDs may be labeled "VisitorNet" to allow visitors to connect to wireless access point. Similarly, another SSID may be labeled "EmployeeNet" to enable employees to connect to wireless access point 803.

When connecting to wireless access point 803 for the first time, a visitor will need to establish an SSID with a label of "VisitorNet" to access wireless access point 803. An employee may be required to enter use a secret key or Wired Equivalent Privacy WEPto access the "EmployeeNet" provided by wireless access point 803. Other security features for either visitors or employees may also be employed and the "EmployeeNet" usually requires additional validation of a system prior to allowing connection to wireless access point 803 as an employee. In this manner, if a visitor tries to access the "EmployeeNet", wireless access point 803 will deny access if a visitor does not have valid access. In one embodiment, a machine access code (MAC) address for employee's system may be used to allow a user to access wireless access point 803. For example, wireless access point 803 may resolve a MAC address of a computer system attempting to connect to "EmployeeNet" and determine if the MAC address is a valid MAC address for an employee. If an invalid MAC address attempting to access "EmployeeNet" is identified (e.g., a visitor), wireless access point 803 will deny access.

Figure 9:
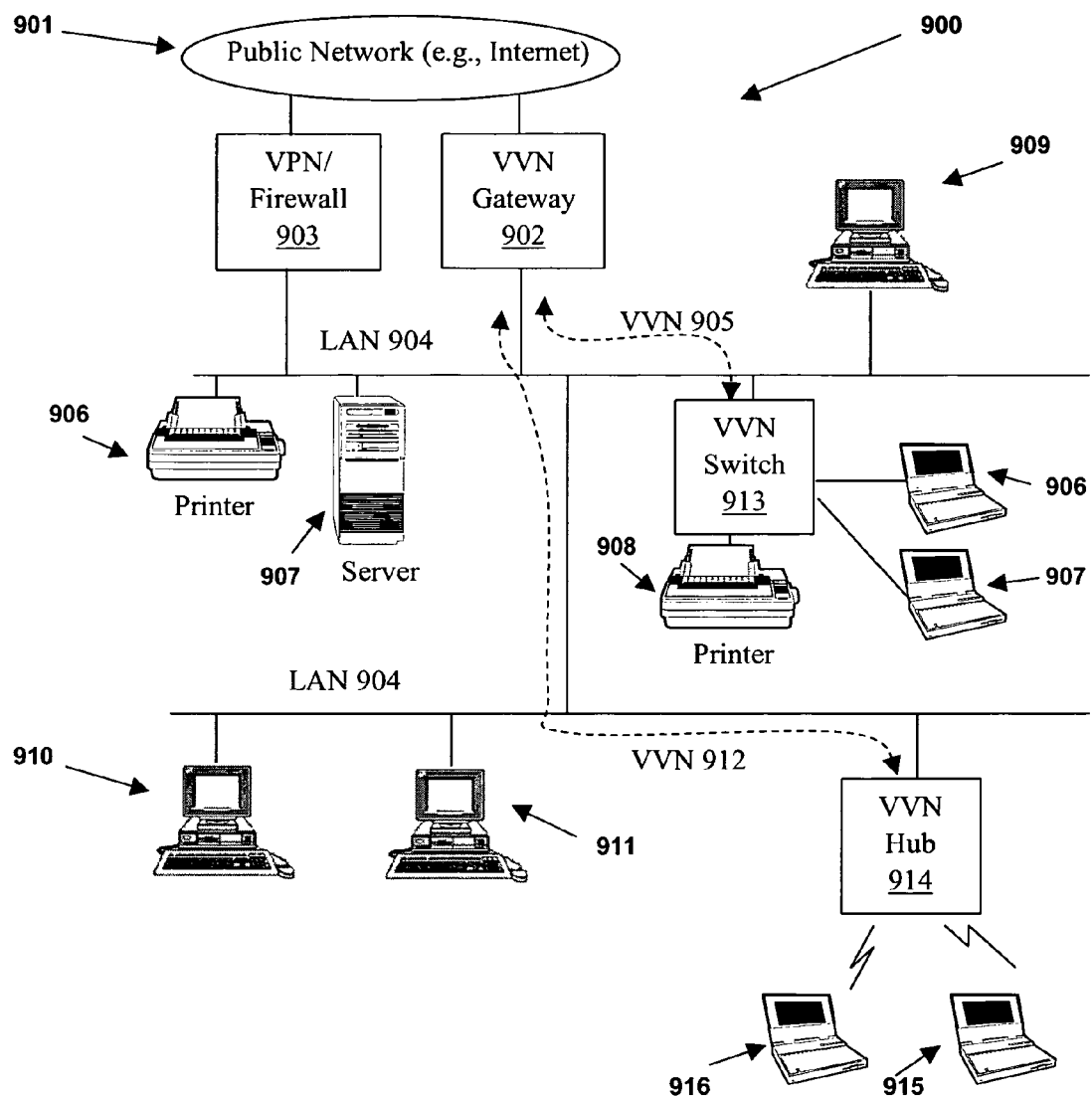
FIG. 9 illustrates a functional block diagram of a network employing wire line and wireless virtual visitor access points incorporated within an Ethernet based private local area network according to one embodiment of the invention.

FIG. 9 illustrates a functional block diagram of a network employing wire line and wireless virtual visitor access points incorporated within an Ethernet based private local area network according to one embodiment of the invention. A network, illustrated generally at 900, includes an Ethernet—based private local area network 904 connecting several network nodes including a first workstation 910, second workstation 911, and third workstation 909 which may include desktop computing systems, laptop computing systems, or any other type of system that may be connected to an Ethernet-based network. Network printer 906, server 907 and other types of network nodes are also connected and accessible via private LAN 904. Network 900 further includes a firewall and virtual private network gateway 903. Server 907 may be a Domain Name Server (DNS), DHCP server, Enterprise Server, network storage or data server, or any other type of server.

Private LAN 904 further includes a virtual visitor network switch 913 configured as a switch and connectable to virtual visitor network (VVN) gateway 902 operable to establish a first virtual visitor network (VVN) 905 within private LAN 904 and a virtual visitor network hub 914 configured as a hub and connectable to (VVN) gateway 902 and operable to establish a second virtual visitor network (VVN) 912. A network hub or switch may be employed wherein a network hub is a device with shared bandwidth for all users and a network switch provides full bandwidth to individual user coupled to private LAN 904. For example, virtual visitor network switch 913 and/or virtual visitor network hub 914 may be configured to support various communication data rates such as 10 Mbytes/Second, 100 Mbytes/Second, 1 GBytes/Second, etc.

Virtual visitor network switch 913 allows for wire line access of a first visitor computer system 906 and second visitor computer system 907. A visitor printer 908 is also coupled to virtual visitor network switch 913 and allows first visitor computer system 906 and second visitor computer system 907 to print documents without having to access private LAN 904. Virtual visitor network switch 913 may include logic to provide a print server however other embodiments may include utilizing a network nodes such as a print server located within private LAN 904. For example, virtual visitor network switch 913 may establish a VVN between VVN module 913 and a network printer 906.

Network 900 further allows visitors to access private LAN 904 using virtual visitor network hub 914 operable to provide a wireless-enabled network such as an 802.11-based network to connect a first wireless-enabled visitor computer system 916 and second wireless-enabled visitor computer system 915. Virtual visitor network hub 914 is provided in association with virtual visitor network server 902 and provides a visitor wireless access to private LAN 904 through second virtual visitor network 912.

During operation, first VVN 905 and second VVN 912 protect enterprise network or private LAN 904 from visitors by confining and directing packets between a visitor's computer system to a public network 901 through use of first VVN 905 and second VVN 912. A visitor may connect their computer to a virtual visitor network switch 913 or virtual visitor network hub 914 to access the Internet or public network 901. First VVN 905 and second VVN 912 establish a virtual tunnel between VVN gateway 902 and VVN switch 913 and VVN Hub 914. VVN gateway 902 may have a direct connection to public network 901 (e.g., Internet) or an indirect connection through a security device such as VPN/Firewall 903 as shown in FIG. 8. In one embodiment, VVN gateway 902 may be provided as an integral part of VPN/Firewall 903, NAT, etc.

First VVN 905 and second VVN 912 provide several advantages over conventional networks and allow for a simplified visitor access networking solution without having to add an additional private networks to an enterprise network for visitors which may require Information Technology (IT) managers to manage providing visitors access within an exiting enterprise network. For example, network managers will not be required to assign special network outlets or dedicate network ports in a switch, router, wall outlets, etc. for visitors. Such configurations may not guarantee protection of an enterprise network from hacking visitors. Additionally, network outlets are not easily movable and would need to be verified to insure that no visitor is accessing the enterprise network directly.

Additionally, VVN switch 913 and/or VVN hub 914 may be provided in various colors, such as bright yellow, red, etc., to be visually identifiable by a visitor. In one embodiment, VVN switch 913 and/or VVN hub 914 may be provided as modular device that may be connected to any network outlet within private LAN 904. For example, IT managers can provide a visitor a modular device incorporating VVN switch 913 and a visitor can simply plug or connect VVN switch 913 to any available network outlet within private LAN 904 allowing VVN switch 913 to be easily transferred as needed to various rooms, offices, conference rooms, etc. having network connections or ports for private LAN 904. In this manner, when a visitor connects a computer, such as first visitor computer system 906, to modular VVN switch 913, VVN gateway 902 identifies VVN switch 913, and monitors and controls VVN switch 913 connected to a network outlet of private LAN 904. In this manner, VVN switch 913 and VVN gateway 902 confine a visitor's packets (not expressly shown) and prevent visitors from accessing other locations, devices, nodes, etc. within private LAN 904.

Figure 10:
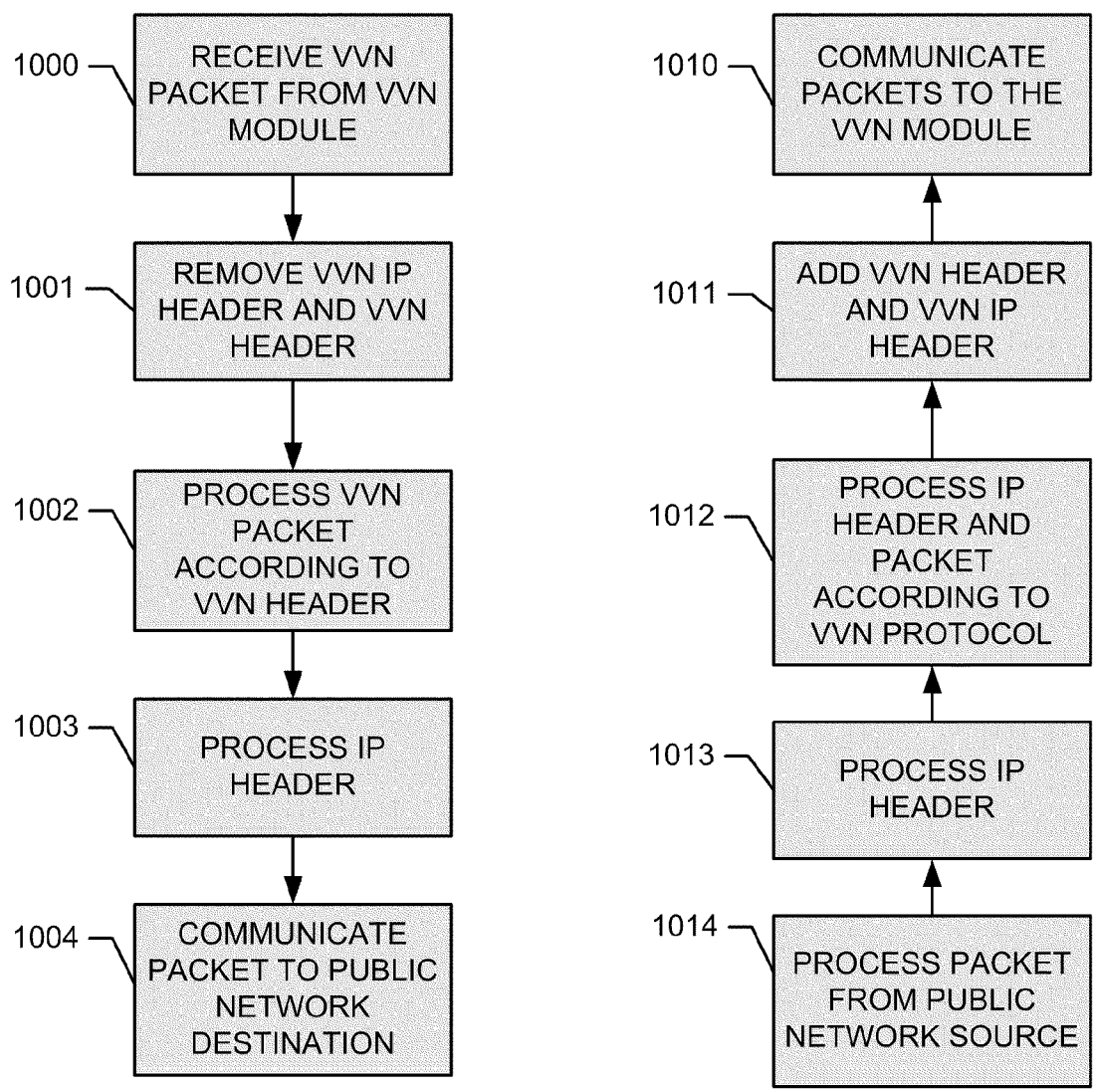
FIG. 10 illustrates a flow diagram of a method for processing data packets using a virtual visitor network gateway according to one embodiment of the invention.

FIG. 10 illustrates a flow diagram of a method for processing data packets using a virtual visitor network gateway according to one embodiment of the invention. The method may be employed within a program of instructions embodied within a computer readable medium, a memory device, encoded logic, or other devices, modules or systems operable to use a portion or all of the method illustrated in FIG. 10. The method may be employed by VVN gateway 208 illustrated in FIG. 2, VVN gateway 400 illustrate in FIG. 4, VNS 1300 illustrated in FIG. 13, or any other system operable to employ the method illustrated in FIG. 10.

Data packets may be received from within a private LAN (step 1000) or from a public network (step 1014). At step 1000, data packets are received from a VVN module located within a private LAN and the VVN IP header and VVN header of the data packet are removed 1001. The VVN packet is processed 1002 using a specification provided within the VVN header. Such processing results in providing the same data packet communicated by a visitor system and processed by a VVN module (not expressly shown). The IP header is processed 1003 by replacing the source IP address (i.e. VVN module's IP address) with the VVN gateway's IP address 1003. Data packets are then communicated to a public network destination address 1004.

At step 1014, a data packet is received by a VVN gateway from a public network source and the data packet is processed 1013 by modifying the IP header by replacing the destination address (e.g. VVN gateway) with the VVN module's address. The IP header and data received from a source in the public network are processed 1012 which may include processing to add a security feature or scrambling the data contents of the data packet. At step 1011, a VVN header is provided to indicate the method of processing used at step 1012 and a VVN IP header including a destination of address of the VVN module is also provided. Upon adding the VVN header and VVN IP header, data packets are then communicated to the VVN module 1010.

Figure 11:
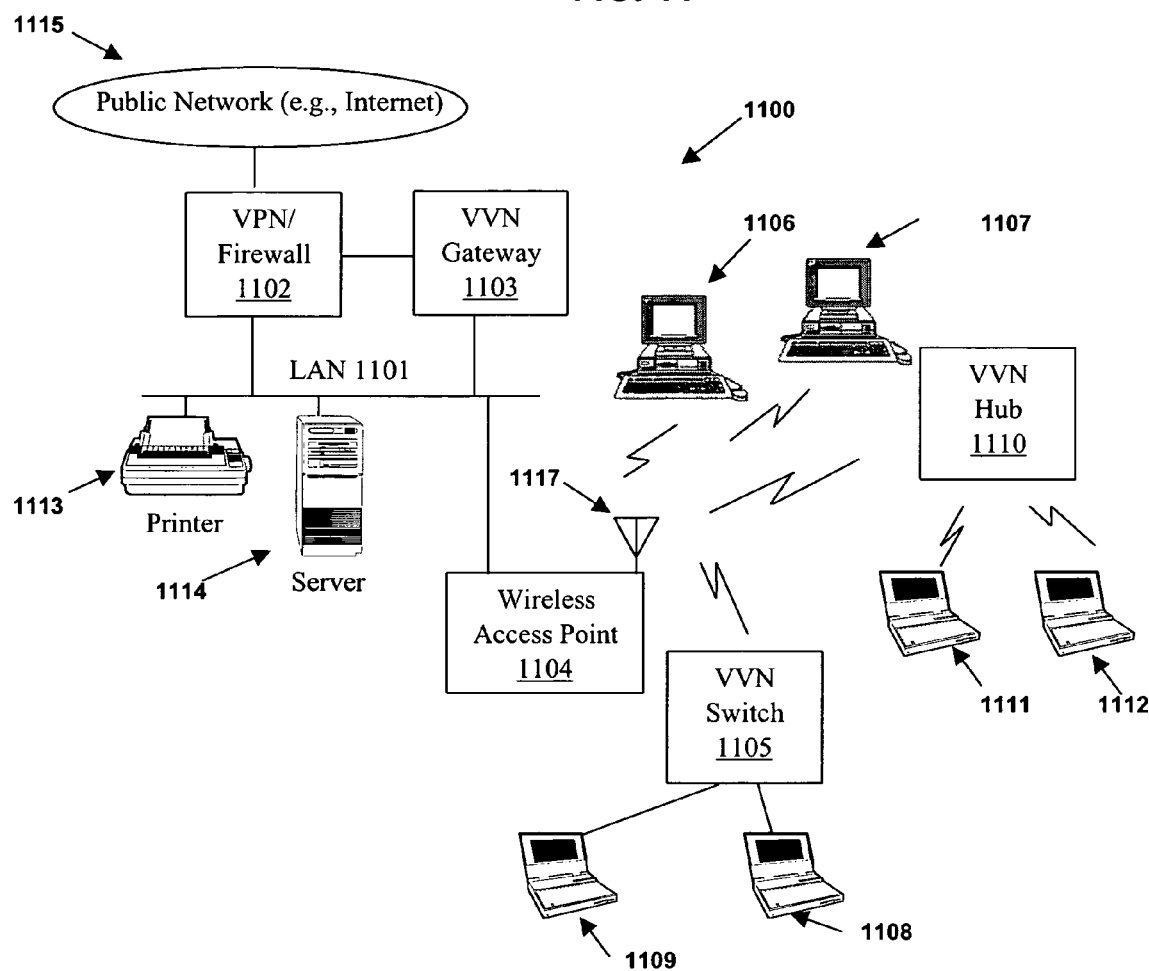
FIG. 11 illustrates a functional block diagram of an enterprise network incorporating a virtual visitor network employing a wireless private local area network according to one embodiment of the invention.

FIG. 11 illustrates a functional block diagram of an enterprise network incorporating a virtual visitor network employing a wireless private local area network according to one embodiment of the invention. An enterprise network, illustrated generally at 1100, may be coupled to a public network 1115 such as the Internet through a LAN gateway 1102 employing a firewall and/or virtual private network. Enterprise network 1100 further includes a virtual visitor network (VVN) gateway 1103 coupled to LAN gateway 1102 and provided in association with a wireless virtual visitor network (VVN) switch 1105 and wireless virtual visitor network (VVN) hub 1110 operable to provide one or more visitors access to public network 1115. For example, first visitor computer system 1108 and second visitor computer system 1109 may be connected to wireless VVN switch 1105 using wire-line connections. Additionally, third visitor computer system 1111 and fourth visitor computer system 1112 may be wirelessly connected to wireless VVN hub 1110.

During operation, wireless access point 1104 communicates with each 802.11b enabled device operable to provide access to private LAN 1101 via a wireless communications. For example, first computer system 1107 and second computer system 1107 may be employee systems and may include embedded 802.11b communication devices operable to communicate with access point wireless 1104 provided as a part of private LAN 1101. Wireless VVN hub 1110 does not include physical ports for visitors and may easily support many visitors relative to wireless VVN switch 1105 having only wireline connectivity. Wireless VVN switch 1105 and wireless VVN Hub 1110 may be wirelessly connected to private LAN 1101 via wireless access point 1104. Private LAN 1101 may be an Ethernet-based network however other communication mediums and protocols, such as fiber, ATM, and the like may also be employed. Private LAN 1101 further connects an enterprise server 1114, network printer 1113 and other network nodes providing users access to data storage, applications, etc.

Wireless devices illustrated in FIG. 11 may be provided as local wireless area network devices or systems that may operate using an 802.11x wireless standard where x=a, g, or b. Additionally, wireless VVN switch 1105 may be provided as a client-based hub communication as an 802.11b enabled station coupled to wireless access point 1104. As such, wireless access point 1104 need not contain a VVN module to connect communicate data packets within a virtual visitor network. For example, a VVN network may be established between wireless VVN switch 1105 and VVN gateway 1103 or wireless VVN hub 1110 and VVN gateway 1103, respectively. Wireless VVN Hub 1110 and wireless VVN switch 1105 are wirelessly coupled to wireless access point 1104 and may be configured to communicate using a different channels to avoid interference and/or conflicts. For example, a wireless private LAN 1117 may be provided via wireless access point 1104 through enabling channel one (1) to allow first employee computer system 1106, second valid computer system 1107, and wireless VVN switch 1105 and wireless VVN hub 1110 to connect to wireless private LAN 1117. If a visitor attempts to directly access wireless access point 1104 within private wireless LAN 1117 using channel one (1), wireless access point 1104 will reject the visitor as not being a registered or valid user. Additionally, when wireless VVN hub 1110 is accessing wireless access point 1104 via channel 1, wireless VVN hub 1110 uses a different channel, e.g., channel 6, to communicate with visitor computers 1111 and 1112.

Enterprise network 1100 may also employ various types, configurations, and/or combinations of VVN hubs. For example, enterprise network 1100 may employ a wire-line only connection to private LAN 1101 for visitors as illustrated, for example, in FIG. 3. Additionally, enterprise network 1100 may employ a wire-line connection to private LAN 1101 and wireless connection for visitors to private LAN 1101 as illustrated in FIG. 9. Other embodiments may include providing a wireless connection to private LAN 1101 and wire-line connection for visitors to private LAN 1101 as illustrated by wireless VVN hub 1105. Enterprise network 1100 may also employ a wireless connection for both visitors and valid users or employees as illustrated in FIG. 8. As such, various combinations and levels of wireless and wire-line access to public network 1115 via private LAN 1101 may be provided within enterprise network 1100 while ensuring network integrity, security, and efficient access are provided.

In one embodiment, VVN modules may be communicatively coupled allowing visitors systems to communicate with each other. For example, VVN gateway 1103 may manage users connected wireless VVN hub 1110 and/or wireless VVN switch 1105 and may allow multiple users to have access each others system. In this manner, multiple visitors from the same company may be able to communicate within enterprise network 1100 thereby providing a private visitor LAN between visitors.

Figure 12:
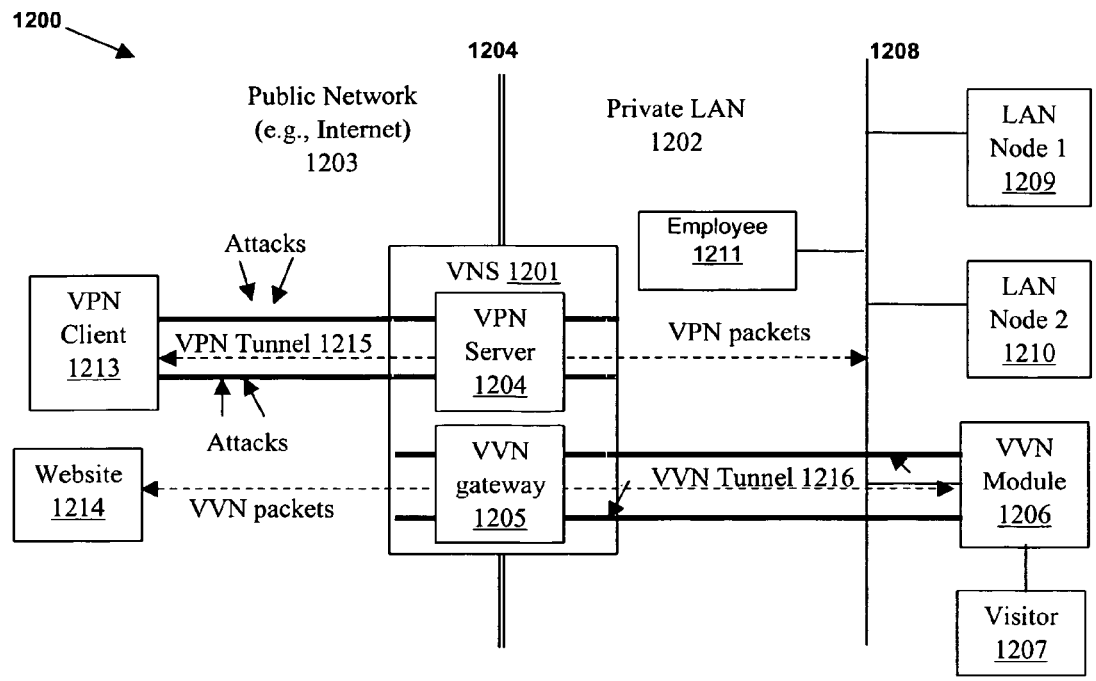
FIG. 12 illustrates a functional block diagram of a virtual network gateway operable to provide a virtual private network in the public network and a virtual visitor network within a private local area network according to one embodiment of the invention.

FIG. 12 illustrates a functional block diagram of a virtual network gateway operable to provide a virtual private network and a virtual visitor network within a private local area network according to one embodiment of the invention. An enterprise network, illustrated generally at 1200, allows for users to access a private LAN 1202 from both a public network 1203 and from within private LAN 1202. Enterprise network 1200 includes a virtual private network (VPN) client 1213 operable to be coupled to a VPN server 1204 which may be provided internal or external to a virtual network server (VNS) 1201. Enterprise network 1200 further includes a virtual visitor network (VVN) module 1206 operably connected to a virtual visitor network (VVN) gateway 1205 which may be provided internal or external to VNS 1201. Private LAN 1202 further includes a local area network based on Ethernet 1208 operable to connect multiple nodes such as first LAN node 1209 and a second LAN node 1210. VVN module 1206 may also be connected to private LAN 1202 via Ethernet 1208.

Figure 13:
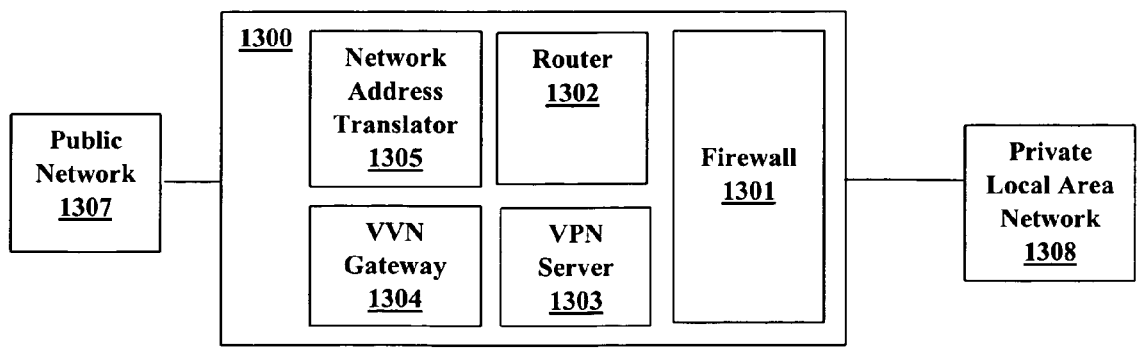
FIG. 13 illustrates a functional block diagram of a virtual network server for use in association with providing a visitor access to a public network from within a virtual private network enabled private local area network according to one embodiment of the invention.

During operation, enterprise network 1200 may protect employees accessing private LAN 1202 from VPN client 1213 when accessed via public network 1203. VPN server 1204 serves as a gateway that is located between private LAN 1202 and public network 1203. A virtual communication tunnel or VPN tunnel 1215 is created using encryption to exchange data packets between VPN client 1213 and VPN server 1204. Through establishing a VPN tunnel 1215, network attacks that originate from public network 1203 are obviated and VPN data packets may be communicated securely within private LAN 1202. Enterprise network 1203 further includes a VVN tunnel 1216 created to protect private LAN 1202 from network attacks that may originate from inside VVN tunnel 1216 established between VVN gateway 1205 and VVN module 1206. VVN data packets are confined to VVN tunnel 1216 and as such attacks that may originate from within a VVN tunnel 1216 are confined to VVN gateway 1205 and VVN module 1206 and cannot escape VVN tunnel 1216. VPN tunnel 1215 and VVN tunnel 1216 are virtual networks which do not exist as physical entity in the physical network FIG. 13 illustrates a functional block diagram of a virtual network server for use in association with providing a visitor access to a public network from within a virtual private network enabled private local area network according to one embodiment of the invention. A virtual network server (VNS) is illustrated generally at 1300 and includes several modules and components including a network address translator 1305, a router 1302, and a firewall 1301. VNS 1300 further includes a virtual private network (VPN) server 1303 and a virtual visitor network (VVN) gateway 1304. VPN server 1303 and VVN gateway 1304 provide access between private local area network (LAN) 1308 and a public network 1307 and may be used within an enterprise network (not expressly shown). In some embodiments, VNS 1300 may only include VVN gateway 1304 and/or VPN server 1303 however in other embodiments VNS 1300 may include each functional module or component illustrated. In some embodiments, other forms of protection may also be provided including a DHCP server, intrusion detection modules, servers or software provided as a part of, or in association with, VNS 1300.

VNS 1300 is a comprehensive security device that provides support services for a business protects private LAN 1308 from intruders from public network 1307, manages privacy within private LAN 1308, and protects private LAN 1308 while providing visitors and authorized users to access to public network 1307 from within the same network environment. During operation, a visitor may access private LAN 1308 via a visitor access point within private LAN 1308. Network address translator 1305 and router 1302 resolve network traffic communicated from private LAN 1308 and determine header information and route traffic based on header and other information provided. For example, a data packet may include a destination or source address information communicated from a virtual visitor network module or hub (not expressly shown) and may be resolved by NAT 1305 and provided to VVN gateway 1304 for processing. VVN gateway 1304 may extract a destination or website being requested within public network 1307 and any other processing information, and process data packets using processing information to restore data packets prior to forwarding to public network 1307 thereby allowing a visitor to access a public network from within private LAN 1308. When data packets are returned from public network 1307, VNS 1300 determines the computer system requesting the data (i.e. employee, visitor, etc.) and processes the data packets if required.

In some embodiments, VVN gateway or VNS 1300 may include a VVN management application (not expressly shown) for managing or monitoring a visitor network(s) provided within private LAN 1308. For example, a VVN management application may be used to change, alter, or configure a virtual visitor network, add and delete VVN features, modify access rights for a VVN, create a VVN status report, create a VVN public access report, manage VVN modules, manage software versions, etc. For example, a VVN management application may keep track of usage within a VVN, monitor for intrusions, and provide alarm notifications when suspicious activities are detected, communicate software upgrades to VVN modules, etc. The VVN management function may be an integral part of VNS 1300 or may be provided as a part of a network server within private LAN 1308.

Figure 14:
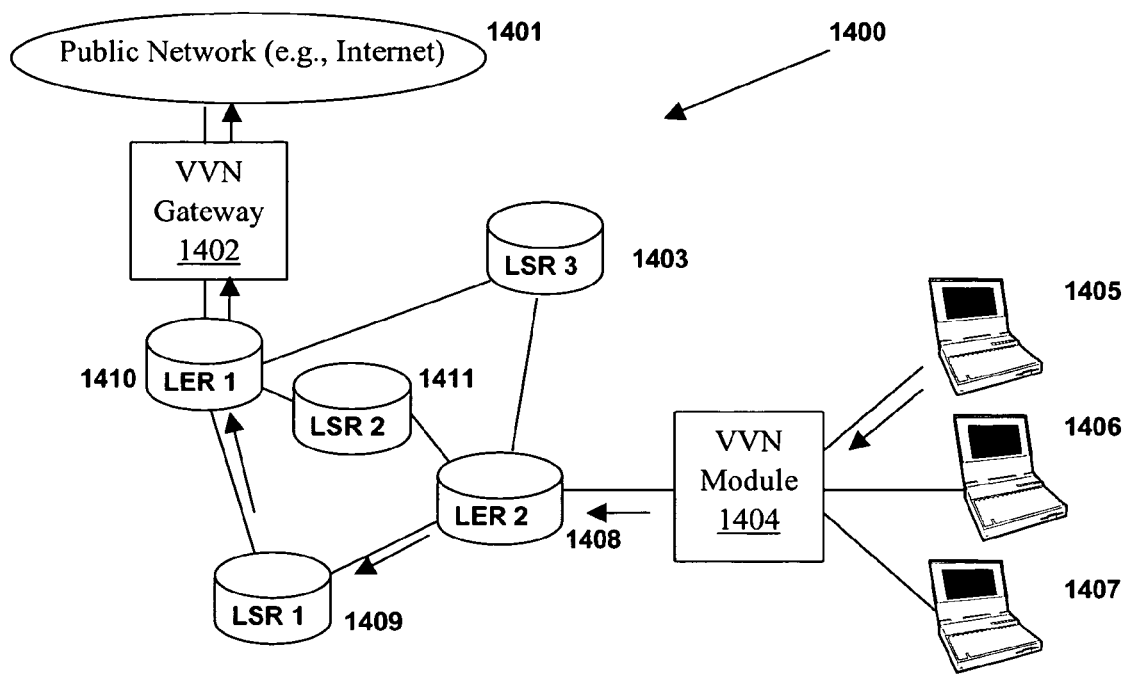
FIG. 14 illustrates a functional block diagram of a virtual visitor network incorporated within a multi-protocol label switching enabled local area network according to one embodiment of the invention.

FIG. 14 illustrates a functional block diagram of a virtual visitor network incorporated within a multi-protocol label switching enabled local area network according to one embodiment of the invention. A Multi-Protocol Label Switching (MPLS) enabled LAN, illustrated generally at 1400, includes a virtual visitor network (VVN) module 1404 which may be used to connect first visitor computer system 1405, second visitor computer system 1406, and/or third computer system 1407 to an enterprise network employing a private LAN. VVN module 1404 is connected to a virtual visitor network (VVN) gateway 1402 using MPLS enabled LAN 1400. MPLS communication protocol confines data packets between VVN gateway 1402 and VVN module 1404. MPLS is an Internet Engineering Task Force (IETF) standard that utilizes label switching to forward data packets through MPLS enabled network 1400. A label is a small identifier placed within a data packet and inserted at an ingress router or a second label edge router (LER 2) 1408 and removed at an egress router or first label edge router (LER 1) 1410. A first label switching router (LSR 1) 1409, second label switching router (LSR 2) 1411, and third label switching router (LSR 3) 1403 communicate data packets between second label router (LER 2) 1408 and first label edge router (LER 1) 1410. For example, an LSR is a router provided within an MPLS network that participates in establishing Label Switched Paths (LSPs) using an appropriate label switching. A LER is a device that operates at the edge of network being accessed and interfaces an MPLS network. LERs support multiple ports and forward network traffic through a MPLS enabled network after establishing LSPs. LERs are used to assign and remove labels as data packets enter or exit an MPLS network.

During operation, as data packets transition through MPLS enabled network 1400, label tables, or a Label Information Base (LIB) is consulted by each component, LER 2 1408, LER 1 1410, LSR1 1409, LSR 2 1411, and LSR 3 1403. For example, an inbound reference maintained by LIB is determined and an outbound interface, communication path or label-switching path (LSP), and outbound label are determined. A LSP includes a sequence of labels that identifies each node or LSR along a communication or transmission path from a source to a destination. An LSP is established either prior to data packets being transmitted or upon detection of a certain flow of data.

VVN module 1404 may be connected to LER 2 1408 and VVN gateway 1402 may be connected to VVN gateway 1402 using LER 1 1410. LER 2 1408 may establish an LSP for VVN module 1404 to send data packets to VVN gateway 1402. Similarly, LER1 1410 may set up an LSP for VVN gateway 1402 to send data packets to VVN module 1404. As such, an LSP for sending data packets to VVN gateway 1402 from VVN module 1404 may be different from an LSP for sending data packets from VVN gateway 1402 to VVN module 1404. In this manner, all data packets coming from VVN module 1404 are routed to VVN gateway 1402 within MPLS network and all data packets from VVN gateway 1402 are directed to VVN module 1404 via MPLS enabled private LAN 1400. As such, MPLS enabled private LAN 1400 escorts data packets or ensures a specific destination for visitor data packets may be achieved.

In some embodiments, LER 1 1410 may be incorporated within or provided as a part of VVN gateway 1402. Similarly, LER 2 1408 may be incorporated within or provided as a part of VVN module 1404. In this manner, VVN module 1404 and VVN gateway 1402 may establish an LSP for data packets. For example, when data packets are delivered from VVN module 1404 to VVN gateway 1402, VVN module 1404 may generate labels for data packets to be maintained with an LIB and VVN gateway 1402 may delete labels from the LIB when data packets are received. Likewise, when data packets are communicated from VVN gateway 1402 to VVN module 1404, VVN gateway 1402 may create labels within an LIB and VVN module 1404 may remove labels from the LIB. In this manner, one or more portions of an MSLP network may be provided as a part of a virtual visitor network to allow a visitor to access a public network from within a private network without compromising security of an enterprise network.

Figure 15:
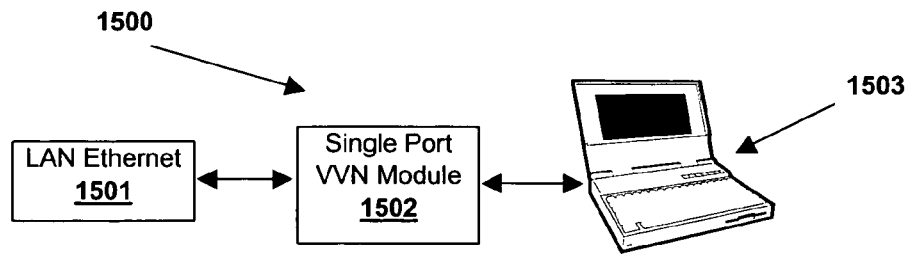
FIG. 15 illustrates a functional block diagram of a single point virtual visitor network module operable to provide a visitor access to a public network from within a private local area network according to one embodiment of the invention.

FIG. 15 illustrates a functional block diagram of a single point virtual visitor network module operable to provide a visitor access to a public network from within a private local area network according to one embodiment of the invention. A private local area network (LAN), illustrated generally at 1500, includes a local area network Ethernet access point 1501, operable to provide access to a visitor computer 1503 using a single port VVN module 1502 operable to be coupled to LAN Ethernet 1501. Single port VVN module 1502 may be implemented to allow a single individual to access private LAN 1500 and may be provided as a standalone module or as an accessory that may be provided as a part of, or incorporated within, visitor computer 1503. For example, as a standalone module or device, VVN module 1502 may use an AC adapter for power and single port VVN module 1502 may include only two communication ports (not expressly shown). One port connects to LAN Ethernet 1501 and a second port to connect to visitor computer 1503. As such, only a single user may connect to single port VVN module and access LAN Ethernet 1501.

During use, information or data packets communicated from visitor computer 1503 may be processed to ensure that a virtual visitor network is maintained within LAN Ethernet 1501. Single Port VVN module 1502 may well suited for use within a hotel room or a multiple residential community where single port VVN module 1502 may be located as a permanent device within a specific room.

In another embodiment, single port VVN module 1502 may be a Universal Serial Bus (USB) enabled device that is powered by visitor computer 1503 when plugged into a USB port of visitor computer 1503. For example, a visitor may plug-in USB enabled single port VVN module 1502 into a USB port of visitor computer 1503. A network cable such as an RJ-45 cable provided in association with, or integrated as a part of, USB enabled single port VVN module 1502 may be coupled to a wall outlet of LAN Ethernet 1501. In this manner, single port VVN module 1502 may communicate with a VVN server (not expressly shown) without tethering users together to a multi-port VVN module thereby allowing visitors mobility within an enterprise premise and enabling visitors to use any LAN outlet within private LAN 1500.

Note that although an embodiment of the invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the invention is not intended to be limited to the specific form set forth herein, but on the contrary, it is intended to cover such alternatives, modifications, and equivalents, as can be reasonably included within the spirit and scope of the invention.

What is claimed is:

1. A device, comprising:
    a port configured to receive a plurality of data packets, wherein each received data packet of the plurality of data packets includes a first Internet Protocol (IP) header having a source address and a destination address;
    a network translator configured to:
        determine whether a source of a data packet of the plurality of data packets is associated with a visitor identifier or an employee identifier; and
    a processor configured to:
        responsive to a determination that the source of the data packet is associated with the visitor identifier, process the first IP header by replacing the source address of the data packet with a private network address of the device, and encapsulate the data packet, wherein the encapsulation includes appending a second IP header to each data packet, the second IP header including the private network address of the device as a source address, and further including a private network address of a gateway as the destination address; and
    wherein the device is configured to, in response to a determination that the data packet is associated with the employee identifier, cause the data packet to traverse the device without encapsulating the data packet, and
    wherein the device is further configured to assign dynamic IP addresses exclusively to sources associated with visitor identifiers using a Dynamic Host Configuration Protocol (DHCP).

2. The device of claim 1, wherein the processor is further configured to encrypt data packets received from one or more visitor computers, and wherein the encapsulation further includes appending a packet processing header for processing the data packets received from one or more visitor computers, the packet processing header including information related to the encryption.

3. The device of claim 1, wherein the network translator is further configured to:
    determine whether the data packet is received from the gateway in the private network; and
    responsive to determining that the data packet is received from the gateway, process the first IP header by replacing the destination address with an address of the visitor computer.

4. The device of claim 1, wherein the processor is operable to process visitor data prior to enabling visitor access to the public network when connected to the private network, the device further comprising:
    a network router operable to route the encapsulated packets to the gateway.

5. The device of claim 1 wherein the port is configured to receive the plurality of data packets via a wireline communication interface.

6. The device of claim 1 wherein the port is configured to receive the plurality of data packets via a wireless communication interface.

7. The device of claim 1 further comprising a communication interface for a multiple protocol label switch (MPLS) network.

8. The device of claim 1 wherein the processor is configured to execute an IP sec algorithm to encapsulate each of the plurality of data packets.

9. The device of claim 1 wherein the processor is configured to execute a secure socket layer (SSL) to encapsulate each of the plurality of data packets.

10. The device of claim 1 wherein the port is configured as a USB enabled communication interface.

11. A gateway, comprising:
a network access interface configured to receive an encapsulated packet from an access device connected to a private network,
wherein the encapsulated packet includes a first Internet Protocol (IP) header with a private network address of the access device as a source address and a private network address of the gateway as a destination address,
wherein the access device receives data packets from sources having visitor identifiers or employee identifiers,
wherein the access device replaces a source address of the data packet with a private network address of the access device and encapsulates the packet within the first IP header in response to determining that the packet has a visitor identifier,
wherein the access device is configured to assign dynamic IP addresses exclusively to sources associated with visitor identifiers using a Dynamic Host Configuration Protocol (DHCP),
wherein the private network address of the gateway is a dynamic IP address, and wherein the encapsulated packet further includes a second IP header with the private network address of the access device as a source address and an address on the public network as a destination address; and
a data processor configured to process the encapsulated packet by removing the first IP header, and replace the source address of the second IP header with a public network address of the gateway, and configured to route the processed packet on the public network based on the destination address in the second IP header.

12. The gateway of claim 11 further comprising a network interface configured to communicate with a Multi-Protocol Label Switching (MPLS) enabled local area network (LAN).

13. The gateway of claim 11, wherein the encapsulated packet is routed from the access device to the gateway in accordance with the destination address of the destination address of the second IP header.

14. The gateway of claim 11 further comprising a virtual private network server operable to provide access to the private network from the public network.

15. The gateway of claim 14, wherein the network access interface is configured to receive packets from at least one network entity other than the access device and to route the received packets in accordance with destination addresses of the received packets.

16. The gateway of claim 11 further comprising a virtual network server operable to provide a virtual visitor network tunnel between the virtual network server and at least one virtual visitor network module.

17. The gateway of claim 11 further comprising a virtual network server operable to provide a virtual private network between a virtual private network client and the gateway connected to the public network.

18. The gateway of claim 11 further comprising an MPLS enabled label edge router operably coupled to the private network and the gateway to provide communication within the private network.

19. The gateway of claim 11, wherein the private network address of the gateway and the public network address of the gateway are different.

20. The gateway of claim 11, wherein the encapsulated packet further includes encrypted data and a packet processing header including information for processing the encapsulated packets including the encrypted data, and wherein the data processor is further configured to process the encapsulated packet according to the information.

21. A method, comprising:
at an access device, receiving a data packet from a system connected through a visitor access port to a private network, wherein the received data packet includes a first IP header including a source address and a destination address;
the access device assigning a dynamic IP address to the system using a Dynamic Host Configuration Protocol (DHCP) exclusively when the system is associated with a visitor identifier;
responsive to a determination that the received data packet is associated with the visitor identifier:
the access device replacing a source address of the data packet with a private network address of the access device;
the access device encapsulating the received data packet by appending a second IP header to the received data packet, the second IP header including a private network address of the access device as a source address, and further including a private network address of a gateway in the private network as the destination address, and routing the encapsulated data packet to the gateway identified in the second IP header destination address; and
responsive to a determination that the received data packet is associated with an employee identifier, wherein the employee identifier is not the visitor identifier:
the access device permitting the received data packet to traverse the device without encapsulating the received data packet.

22. The method of claim 21, wherein at least one of the data packets is an IP data packet.

23. The method of claim 21, wherein the visitor access port has a wire line connection to the visitor system.

24. The method of claim 21, wherein the visitor access port has a wireless connection to the visitor system.

25. The method of claim 21, wherein the received data packets further include data, the method further comprising:
encrypting the data of the received data packets;
appending a packet processing header for processing the encrypted data packets including the data, the packet processing header including information related to the encryption; and
processing the encrypted data packets at the gateway according to the included information, the processing including decrypting the encrypted data.

26. The method of claim 25, wherein the decrypting includes decrypting destination data.

27. A method, comprising:
receiving a data packet at a gateway device from a device connected to a private network, wherein the data packet includes a first Internet Protocol (IP) header and a second IP header, each IP header including a source address and a destination address, the first IP header including a private network address of the device as the source address and an address in the public network as the destination address, the second IP header including a private network address of the device as source address and a private network address of the gateway device in the private network as the destination address, wherein the device receives data packets from sources having visitor identifiers or employee identifiers, wherein the device replaces a source address of the first IP header with a private network address of the device and encapsulates the packet within the second IP header in response to determining that the packet has a visitor identifier, wherein the device connected to the private network is configured to assign dynamic IP addresses exclusively to sources associated with visitor identifiers using a Dynamic Host Configuration Protocol (DHCP);

at the gateway device removing the second IP header from each received data packet;

at the gateway device modifying each received data packet by replacing the source address of the first IP header with a public network address of the gateway device; and at the gateway device routing the modified data packet on the public network based on the destination address of the first IP header.

28. The method of claim 27, wherein the source and destination addresses of the second IP header are resolvable only within the private network.

29. The method of claim 27, further comprising applying a secure socket layer protocol to the modified data packet.

30. The method of claim 27, wherein the source address and the destination address of the second IP header are each dynamic IP addresses.

* * * * *